(12) United States Patent
Carpenter et al.

(10) Patent No.: US 11,873,994 B2
(45) Date of Patent: Jan. 16, 2024

(54) ELECTRICALLY HEATED CATALYTIC COMBUSTOR

(71) Applicants: JOHNSON MATTHEY PUBLIC LIMITED COMPANY, London (GB); DELTA MOTORSPORT LIMITED, Bicester (GB)

(72) Inventors: Nick Carpenter, Northampton (GB); Guy Chandler, Royston (GB); Jeremy Gidney, Royston (GB); Scott Herring, Northampton (GB); Chris Morgan, Royston (GB); Timothy O'Connell, Royston (GB); Mark Wilksch, Northampton (GB)

(73) Assignees: Johnson Matthey Public Limited Company, London (GB); Delta Motorsport Limited, Bicester (GB)

( * ) Notice: Subject to any disclaimer, the term of this patent is extended or adjusted under 35 U.S.C. 154(b) by 0 days.

(21) Appl. No.: 17/309,248

(22) PCT Filed: Nov. 13, 2019

(86) PCT No.: PCT/GB2019/053215
§ 371 (c)(1),
(2) Date: May 12, 2021

(87) PCT Pub. No.: WO2020/099867
PCT Pub. Date: May 22, 2020

(65) Prior Publication Data
US 2021/0396391 A1 Dec. 23, 2021

Related U.S. Application Data

(60) Provisional application No. 62/760,452, filed on Nov. 13, 2018.

(51) Int. Cl.
*F23R 3/40* (2006.01)
*F02C 7/224* (2006.01)
(Continued)

(52) U.S. Cl.
CPC ............... *F23R 3/40* (2013.01); *F02C 7/224* (2013.01); *F02C 7/264* (2013.01); *F23R 3/005* (2013.01);
(Continued)

(58) Field of Classification Search
CPC .... F23R 3/40; F23R 3/005; F23R 3/30; F23R 3/42; F02C 7/264; F02C 7/224; F05D 2260/213; F05D 2260/99
See application file for complete search history.

(56) References Cited

U.S. PATENT DOCUMENTS 4,065,917 A * 1/1978 Pfefferle ............... F02M 27/02
60/776
5,051,241 A 9/1991 Pfefferle
(Continued)

FOREIGN PATENT DOCUMENTS

EP 0913357 A1 5/1999
GB 2268694 A 1/1994
(Continued)

*Primary Examiner* — Craig Kim

(57) ABSTRACT

The present disclosure is directed to a system comprising a recuperated gas turbine engine with a catalytic combustor, and methods of operating the same, the catalytic combustor comprising: (a) an upstream section comprising an electrical heater and (b) a downstream catalyst section, wherein the upstream section and the downstream catalyst section are disposed adjacent to and in fluid communication with one another.

19 Claims, 3 Drawing Sheets

(51) Int. Cl.
*F02C 7/264* (2006.01)
*F23R 3/00* (2006.01)
*F23R 3/30* (2006.01)

(52) U.S. Cl.
CPC .......... *F23R 3/30* (2013.01); *F05D 2260/213* (2013.01); *F05D 2260/99* (2013.01)

(56) References Cited

U.S. PATENT DOCUMENTS

| | | | |
|---|---|---|---|
| 5,306,470 A | | 4/1994 | Bak |
| 6,107,693 A | | 8/2000 | Mongia et al. |
| 6,109,018 A | * | 8/2000 | Rostrup-Nielsen ... F01N 3/2013 60/777 |
| 6,141,953 A | | 11/2000 | Mongia et al. |
| 6,302,683 B1 | * | 10/2001 | Vestin ..................... F23C 13/02 431/170 |
| 6,313,544 B1 | | 11/2001 | Mongia et al. |
| 6,641,795 B2 | | 11/2003 | Abe |
| 6,669,914 B1 | * | 12/2003 | Wen .......................... F23R 3/40 422/177 |
| 6,718,772 B2 | * | 4/2004 | Dalla Betta ............... F23R 3/40 60/776 |
| 7,430,869 B2 | * | 10/2008 | Su .............................. F23R 3/40 60/777 |
| 7,467,942 B2 | | 12/2008 | Carroni et al. |
| 7,998,424 B2 | | 8/2011 | Bergeal et al. |
| 9,341,098 B2 | * | 5/2016 | Cole ........................ F01N 3/035 |
| 2002/0081253 A1 | * | 6/2002 | Abe ..................... H01M 8/0631 502/100 |
| 2002/0139119 A1 | * | 10/2002 | Touchton ................... F02C 3/34 60/39.511 |
| 2002/0166324 A1 | * | 11/2002 | Willis ........................ H02J 1/14 60/777 |
| 2004/0119291 A1 | * | 6/2004 | Hamrin ..................... H02J 1/10 290/7 |
| 2004/0148942 A1 | | 8/2004 | Pont et al. |
| 2007/0042301 A1 | | 2/2007 | Carroni et al. |
| 2009/0123885 A1 | * | 5/2009 | Vestin ..................... F23C 13/02 431/258 |
| 2009/0133380 A1 | | 5/2009 | Donnerhack |
| 2010/0192592 A1 | | 8/2010 | Anoshkina et al. |
| 2016/0284445 A1 | * | 9/2016 | Lee ........................ C23C 16/545 |
| 2020/0140114 A1 | * | 5/2020 | Andrews, Jr. ............. F02C 6/08 |
| 2021/0396391 A1 | * | 12/2021 | Carpenter ............... F23R 3/005 |

FOREIGN PATENT DOCUMENTS

| | | | | |
|---|---|---|---|---|
| JP | 5-332160 A | | 12/1993 | |
| JP | 11-182814 A | | 7/1999 | |
| JP | 2001-515993 A | | 9/2001 | |
| JP | 2007-500815 A | | 1/2007 | |
| JP | 2011-226651 A | | 11/2011 | |
| RU | 2 342 601 C1 | | 12/2008 | |
| WO | 99/13269 A1 | | 3/1999 | |
| WO | 9914071 A1 | | 3/1999 | |
| WO | 03072919 A1 | | 9/2003 | |
| WO | WO-03072919 A1 | * | 9/2003 | ............. F23C 13/00 |
| WO | 2005/012793 A1 | | 2/2005 | |
| WO | 2009082275 A1 | | 7/2009 | |

* cited by examiner

ELECTRICALLY HEATED CATALYTIC COMBUSTOR

TECHNICAL FIELD

The present disclosure is directed to devices and methods for igniting and controlling air/fuel mixtures in a catalytic combustion chamber, especially within the combustion chamber of a recuperated gas turbine engine, where such engines may be used in power generation and propulsion applications.

BACKGROUND

Gas turbines are used for both fixed and mobile applications for power generation and vehicle propulsion on land, sea and air. The need to reduce harmful exhaust emissions from all types of heat engines is well recognized, and a fundamental part of many solutions is more efficient and cleaner combustion systems. In the field of gas turbine engines, combustion technologies for liquid and gaseous fuels have emerged such as dry-low-NOx (DLN), rich-quench-lean (RQL) and, catalytic combustion. Catalytic solutions remain unsurpassed for reductions of oxides of nitrogen, but have typically required some form of pre-burner to maintain the catalyst above light-off temperature, thereby compromising emissions performance.

In the area of ground transportation there is a move to electrification and "zero emissions" vehicles creating a demand for small ultra-clean engines for hybrid and range extended electric vehicles. Piston engines with emissions after-treatment cannot match the near-zero NOx performance of a catalytic combustor equipped gas turbine, nor can gas turbines with DLN or RQL combustors. DLN combustors can achieve typically about 8-10 ppm $NO_x$, while a catalytically combusted turbine will produce readings of about 1-2 ppm $NO_x$, and this is usually attributed to fuel borne nitrogen, making catalytic combustors essentially zero $NO_x$. Because recuperated gas turbines run at much leaner fuel/air mixtures than simple cycle gas turbines, they can achieve lower emissions of CO and unburned hydrocarbons. For these reasons, the combination of a recuperated gas turbine and catalytic combustion offers near zero emissions (excluding $H_2O$ and $CO_2$) when burning HC fuels.

Typically, catalytic combustion systems are quite effective in reducing the amount of undesirable emissions, resulting from incomplete combustion, once steady-state operating conditions are achieved. However, during the initial start-up of the turbine or engine, the amount of emissions may be above the desired limits. The amounts of undesirable emissions are usually higher during start-up conditions because the catalytic combustion is temperature dependent, being more efficient at higher temperatures, and during start-up, the catalyst is not at a temperature at which it is most effective. A number of strategies have been employed to address this issue, but each are deficient either in terms of complexity or effectiveness. Implementations of catalytic combustors have been relatively complex.

Recuperated gas turbines such as the Capstone range extender use DLN combustors and achieve $NO_x$ emissions below 10 ppm when operated on natural gas. Similar emissions are achieved with liquid fuels but only with the addition of air assisted atomization nozzles, which require the addition of a separate air compressor.

Pre-compressor fuel injection is not viable in gas turbines with conventional (non-catalytic) combustors because the air/fuel ratio is too lean to sustain combustion. The fuel is normally injected into a chamber after the compressor in such a way that a local rich zone supports continuous combustion despite the global air/fuel ratio being too lean for to support combustion. On the other hand, catalytic combustors can sustain combustion at very lean air/fuel ratios, making complete premixing of fuel and air possible in gas turbines. This makes possible novel fuel systems offering simplification and cost reductions.

U.S. Pat. No. 6,302,683 discloses a system where two catalysts are coupled in series with the upstream catalysts being heated, including electrically heated. It is noted that the upstream unit is only used in start-up mode and can be much smaller than the downstream unit. This reduces the electrical power demands of the system but creates additional complexity and bulk because a conical diffuser section between the two catalyst cores is required.

The present disclosure addresses at least some of the deficiencies of the prior art.

SUMMARY

The present disclosure is directed to a recuperated gas turbine engine system employing catalytic combustion. More specifically, this disclosure is directed to a combustor having a catalytic structure, that can be electrically heated to a predetermined temperature prior to start-up of the turbine, or any other system with which it is used, so as to reduce complexity and achieve reduced emissions during the start-up of the system. Electrical heating could be achieved by a) resistance element(s); b) magnetically induced eddy currents; or c) high frequency electromagnetic heating (microwaves).

In some aspects, the system comprising a catalytic combustor comprises:
  (a) an upstream section comprising an electrical heater and
  (b) a downstream catalyst section, wherein the upstream and downstream catalysts sections are disposed adjacent to and in fluid communication with one another.

In some aspects, an electrical resistance heater is used as the electrical heater and it is the only ignition source in the catalytic combustor or elsewhere in the system. In some case, the upstream section and the downstream catalyst section are integrated in a single unit. The catalytic matrices (cores) can be a monolithic (laminar flow), microlithic, or turbulent flow design. Typically, the upstream section and the downstream catalyst section each contain pores or channels which allow for the passage of a gas or a vapor through both of the upstream section and the downstream catalyst section, and from the upstream section to the downstream catalyst section. In certain aspects, the upstream section is optimized for low-flow start-up conditions and the downstream catalyst section is optimized for run conditions. In some aspects, the pores or channels in the upstream section and the downstream catalyst section are in fluid communication with one another and are configured such that, when in use, a majority of combustion occurs in the downstream catalyst section.

The upstream section may not require catalytic properties, thus, does not comprise an upstream catalyst; while the downstream catalyst section may comprise a downstream catalyst.

The upstream section may further comprise an upstream catalyst and/or the downstream catalyst section may further comprise a downstream catalyst. The upstream catalyst and the downstream catalyst may be the same or different. One or both of the upstream or downstream catalysts may comprise Ag, Au, Cu, Co, Cr, Fe, Ir, Mo, Mn, Ni, Pd, Pt, Rh, Sc, Ti, V, W, Y, Zn, Zr, or a combination thereof, in either metallic or oxide form.

The recuperated gas turbine engine system may further comprise additional elements, for example one or more of:
(a) one or more mixing or flame holding devices positioned downstream of the upstream section and the downstream catalyst section;
(b) a fuel/air mixing/vaporizing device positioned upstream of the catalytic combustor, positioned to provide or modulate a fuel/air mixture into the catalytic combustor:
(c) a compressor, optionally a two-stage compressor with intercooling, arranged to receive air and to compress the air;
(d) a fuel system operable to supply fuel into the compressor, such that a mixture of compressed air and fuel can be/is discharged from the compressor;
(e) a turbine arranged to receive the combustion gases, when present, from the catalytic combustor and to expand the gases to produce mechanical power that drives the compressor optionally through one or more mechanical shafts;
(f) a recuperator arranged to receive exhaust gases from the turbine and air or mixture discharged from the compressor and cause heat exchange therebetween such that the air or mixture can be/is pre-heated before entering the catalytic combustor.

This disclosure further describes methods of operating the disclosed recuperated gas turbine engine system. In certain aspects, the methods may comprise:
(a) providing energy to the electrical heater (e.g., an electrical resistance heater) to heat the upstream section to a temperature at least equal to a light-off temperature of a mixture of a fuel and air,
(b) introducing a mass flow of the mixture of air and fuel to the heated upstream section, so as to initiate catalytic combustion in the heated upstream section, and
(c) increasing the mass flow of the mixture of air and fuel through the heated upstream catalyst, so as to project the combusting mixture of fuel and air into the second catalyst section, the combusting mixture having an associated heat.
(d) transitioning to normal running mode after the combustor inlet temperature reaches the catalytic light-off temperature.

Additional aspects of these methods include maintaining the increased mass flow of the mixture of air and fuel through the heated upstream catalyst, such that the heat associated with the combusting mixture of fuel and air, on contacting the downstream catalyst section, is sufficient to raise the temperature of at least a portion of the downstream catalyst section to an ignition temperature of the mixture of a fuel and air in the downstream catalyst section. Under such circumstances, maintaining the increased mass flow may provide heating of substantially all of the downstream catalyst section to the ignition temperature of the mixture of a fuel and air, so that the mixture of fuel and air, as it passes therethrough, is combusted throughout the downstream catalyst section. Once this combustion is initiated, the flow of air/fuel may be modulated in one or both of composition and/or flow rate, in accordance with the requirement of the system. Once a self-sustaining combustion is achieved, the electrical heater may be de-energized even though the combustor inlet temperature is less that the light-off temperature.

In yet further aspects of these methods include maintaining the increased mass flow of the mixture of air and fuel through the heated upstream non-catalyst matrix layer, such that the heat associated with the mixture of fuel and air, on contacting the downstream catalyst section, is sufficient to raise the temperature of at least a portion of the downstream catalyst section to an ignition temperature of the mixture of a fuel and air in the downstream catalyst section. Under such circumstances, maintaining the increased mass flow may provide heating of substantially all of the downstream catalyst section to the ignition temperature of the mixture of a fuel and air, so that the mixture of fuel and air, as it passes therethrough, is combusted throughout the downstream catalyst section. Once this combustion is initiated, the flow of air/fuel may be modulated in one or both of composition and/or flow rate, in accordance with the requirement of the system. Once a self-sustaining combustion is achieved, the electrical heater may be de-energized even though the combustor inlet temperature is less than the light-off temperature.

These and other aspect of the present disclosure are more fully explained elsewhere herein.

BRIEF DESCRIPTION OF THE DRAWINGS

The present application is further understood when read in conjunction with the appended drawings. For the purpose of illustrating the subject matter, there are shown in the drawings exemplary embodiments of the subject matter. However, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
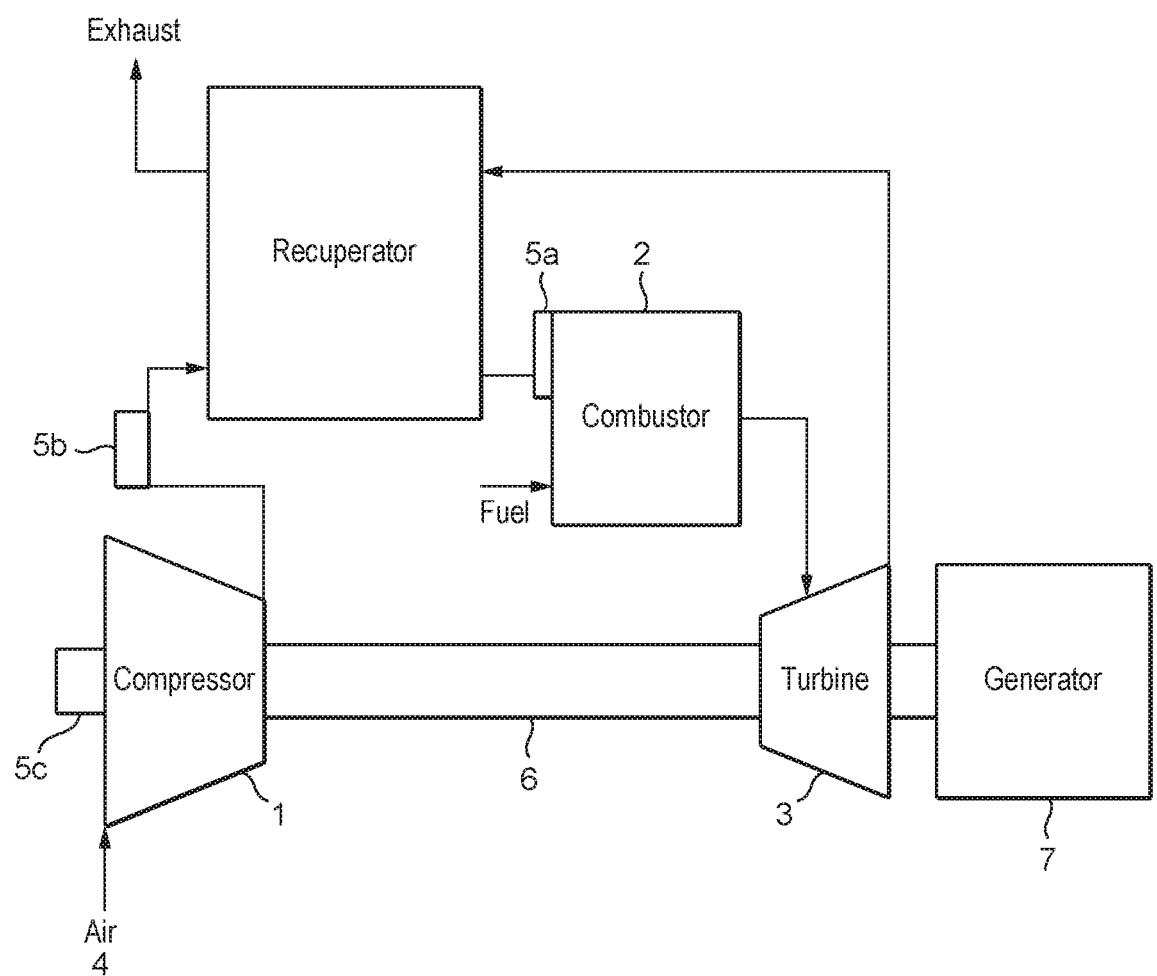
FIG. 1 provides a schematic representation of a system of one embodiment of the whole catalytic engine/generator of the present invention.

Systems and methods of the present disclosure are related to the combination of a recuperated gas turbine and an electrically heated catalytic combustor. Such systems and methods may be useful to hybrid and extended-range electric vehicles to provide near zero emissions. The applicant has demonstrated system embodiments where the catalytic combustor can run at low mass flow with low inlet temperature and with electrical heating only being required for a short time. Such systems and methods allow warm-up of the recuperator, raising combustor inlet temperature above light-off/ignition temperatures, after which the flow can be rapidly increased.

The invention relates to combustion of liquid or gaseous fuels with low harmful emissions by using catalytic combustion, more particularly combustion as used in gas turbine engines. Catalytic combustion systems are already commercially available but are complex and only viable at scales of megawatts. On smaller gas turbines, reduced cost and portability dictate simpler combustor solutions. Smaller turbine engines have limited pressure ratios and high efficiencies can only be achieved by using exhaust heat recovery or "recuperation". It has been discovered that the fundamentally different thermodynamic cycle used in recuperated gas turbines creates an opportunity for simplified implementation of catalytic combustion principles in particular, elimination of pre-heat burners.

Herein is described novel gas turbine engine systems and methods which allow excellent emissions performance and simple low cost design and construction.

The present invention may be understood more readily by reference to the following description taken in connection with the accompanying Figures, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to systems, methods of operating such systems, and power generation and transportation equipment employing such systems. Where the disclosure describes or claims a feature or embodiment associated with a system, methods of operating such a system, or equipment employing such a system, it is appreciated that such a description or claim is intended to extend these features or embodiment to embodiments in each of these contexts (i.e., system, methods of operating such a system, and equipment using such a system).

The System(s)

In some embodiments, the systems of the present disclosure include recuperated gas turbine engine systems employing catalytic combustion, the system comprising a catalytic combustor having an upstream end and a downstream end, the catalytic combustor comprising:
  (a) an upstream section comprising an electrical heater and
  (b) a downstream catalyst section, wherein the upstream section and the downstream catalyst section are disposed adjacent to and in fluid communication with one another.

These systems may also further comprise additional elements described elsewhere herein.

Unless otherwise specified, the term "adjacent" refers to a positioning of one object with respect to another in the standard sense of the word, including those meanings defined by or suggesting proximity, preferably in physical contact one another; i.e., having abutting surfaces.

In some embodiments, the two objects, for example, the upstream section and the downstream catalyst section may comprise an air gap in part or all of the adjacent surfaces therebetween, either deliberately set or adventitiously resulting from incomplete mating of the adjoining surfaces. Where an air gap exists, it can be on the order of one mm thick or less, contrasting the intermediate chamber described in U.S. Pat. No. 6,302,683. In certain embodiments, the air gap may be 5 mm or less, 4 mm or less, 3 mm or less, 2 mm or less, 1 mm or less, 0.5 mm or less, or non-existent. In certain embodiments, the air gap can advantageously provide electrical insulation between the heated and downstream sections.

In other independent embodiments, the two objects, for example, the upstream section and the downstream catalyst section, may comprise a physical spacer between them (for example, a seal).

In other preferred embodiments, the upstream section and the downstream catalyst section are integrated into a single unit, for example, as a monolithic or microlithic construction (for example, as described in U.S. Pat. Nos. 5,051,241 and 5,306,470, which are incorporated by reference herein). Close-coupling the two sections in one housing can minimize thermal losses and can result in early warm-up of the downstream catalyst section. Further, in "start-up" or "pilot" mode, radiation heat exchange between the two sections helps sustain catalytic combustion without electrical power. In this way, the upstream section and the upstream face of the downstream catalyst section can be maintained above light-off temperature of the fuel even when the combustor inlet temperature is at a much lower temperature. In this mode, the combustor can transition to low emissions when measured in %, ppm or some other ratio but because the mass flow during this mode is low, only small amounts of harmful gas emissions result in terms of a typical automotive drive cycle.

Also as used herein, the terms "upstream" and "downstream" may be seen as synonyms for "first" and "second," respectively, describing a series arrangement between the elements, until in use, wherein the terms refer to the relative serial positions of the two ends or sections with respect to the flow of gases or vapors therethrough.

One of the many features of the disclosed systems is that the upstream section comprising the electrical heater may be the only initiation source in the catalytic combustor and no other source or ignition system is required. While in certain embodiments, the system may or may not have separate ignition sources, it is preferred for there to be no ignition source beyond the electrical heater, within either the catalytic combustor or elsewhere in the system. In this regard, the term "igniter" is understood to have its accepted meaning of a device for generating a spark or electric arc. Further, as is disclosed elsewhere herein, the fuel/air mixtures may be optionally heated before entering the upstream end of the catalytic combustor. But it should be realized that these mixtures are maintained at air/fuel ratios above their ignitable lean limit.

This system offers low cost and simplicity as it may operate without any other ignition source thereby reducing capital cost and maintenance requirements.

The upstream section and the downstream catalyst section each contain pores or channels which allow for the passage of a fluid (e.g., gases, liquids, vapor, or mixtures thereof) entering, passing through, and exiting both of the upstream section and the downstream catalyst section. In their constructions, the upstream section is preferably optimized for low-flow start-up conditions and the downstream catalyst section is optimized for run conditions. This may be achieved by providing some optimized combination of the size or configuration of the pores or channels, and/or catalyst formulations. For example, the pores or channels in the upstream section may be larger in size than those of the downstream catalyst section. Alternatively, or additionally, the pores or channels in the upstream section may be configured to provide a more streamlined or direct pass-through of the fluids than the downstream catalyst section (e.g., upstream section is channeled while the downstream catalyst section comprises porously interconnected matrices. In some embodiments, the upstream section and downstream catalyst section may be optimized by including different levels of platinum group metals in the front and rear parts of the downstream catalyst section, such as that described in U.S. Pat. No. 7,998,424 or U.S. Pat. No. 9,341,098, each of which is incorporated herein in its entirety. In some embodiments, the up-stream catalyst section will be optimum with between 5 and 200 cells per square inch whereas the downstream catalyst section may be optimum with smaller cells, such as 200-1000 cells per square inch. In some embodiments, optimum flow lengths for the upstream section are between 5 and 20 mm. In some embodiments, flow lengths for the downstream catalyst section are 40-150 mm. Such optimizations of the catalyst sections may provide more efficient electrical heating.

It is intended that the upstream section operates predominantly during start-up operations, with minimum energy consumption, and that the downstream catalyst section is the predominant catalytic body during full flow running operations. In this regard, the relative size of the upstream section may typically be smaller than that of the downstream catalyst section (i.e., has lower cell density), both in terms of pore or channel size and in term of residence time offered to the passing gases. For example, in some embodiments, the internal surface areas associated with the two sections should be such that the ratio of the pore or channel surface areas of the upstream section to those of the downstream catalyst section are in a range of from 0.5% to 5%.

In terms of construction, one or both of the upstream section and the downstream catalyst section may comprise metallic and/or ceramic materials, for example rolled metal elements or porous ceramic materials, or composites thereof. The upstream section should show appropriate thermal and/or electrical conductivity to allow for efficient use of the electric resistance heaters attached thereto. Exemplary materials for one or both of the sections include chromium and aluminum-containing alloys or oxides, and one or more of silicon oxide, aluminum oxide, titanium oxide, or zirconium oxide, titanium oxide, optionally stabilized by yttria, calcia and/or magnesia.

The upstream section may not have an upstream catalyst, while the downstream catalyst section may comprise a downstream catalyst.

The upstream section may comprise an upstream catalyst and/or the downstream catalyst section may comprise a downstream catalyst. The upstream catalyst may be the same or different than the downstream catalyst, as can the amounts and methods in which the catalysts are applied to the respective sections. In some embodiments, one or both of the upstream or downstream catalysts comprising Ag, Au, Ce, Cu, Co, Cr, Fe, Ir, Mo, Mn, Ni, Pd, Pt, Rh, Sc, Sn, Ti, V, W, Y, Zn, Zr, or combinations thereof, in either metallic or oxide form. In some embodiments, the upstream and downstream catalysts independently comprise Group VIII noble metals, platinum group metals, metals or alloys comprising Ag, Au, Co, Cu, Ir, Ni, Pd, Pt, Rh, or Zn, or combinations thereof, or oxides comprising Cr, Fe, Ir, Mo, Mn, Ti, V, W, Y, or Zr, or combinations thereof. In some embodiments, the upstream and downstream catalysts each independently comprises Group VIII noble metals or the platinum group metals comprising palladium, ruthenium, rhodium, platinum, osmium, and iridium, or combinations thereof. For methane or methane containing fuels, palladium or platinum or a mixture of palladium and platinum may be preferred. For other fuel such as gasoline, diesel fuel, alcohol fuels or a variety of other hydrocarbon fuels, palladium and platinum may be preferred catalysts. For the other fuels, less active catalysts can also be used, including base metal oxide catalysts such as copper, cobalt, manganese, chromium, nickel or other active base metal oxide catalyst either as the pure oxide, in admixture with other elements or dispersed on a second oxide.

The catalysts may be deposited directly on the catalyst section substrate, for example by chemical or vapor deposition techniques, or may be applied using washcoat methods. Materials suitable for use in the washcoat include, but are not limited to, aluminum oxide optionally containing additives such as barium, lanthanum, magnesium, or silicon oxide or zirconium oxide with or without additives such as silicon. The washcoat preferably possesses a moderate to high surface area, for example from 2 to 200 $m^2/g$. The catalyst, active for the reaction of fuel with oxygen, may be deposited on the surface of or within the porous wash coat layer.

Within the downstream catalyst section, the downstream catalyst may be distributed uniformly or non-uniformly throughout the length or axial positioning of the catalyst substrate. In some embodiments, the ratio of precious metal catalyst to substrate can be varied by zoning across the length of the catalyst substrate. In some preferred embodiments, the zoning includes a higher loading of the catalyst (e.g., platinum group catalyst) in the upstream axial region of the honeycomb substrate, and a lower catalyst loading (again, e.g., platinum group catalyst) in the downstream axial region of the substrate. In other embodiments, the catalyst zoning is oppositely distributed (i.e., higher loading in the rear region relative to the front region).

The rationale behind optimizing catalyst zoning would be to get maximum effect of the precious metal catalyst used. The present inventors have observed that the downstream end of the catalyst substrate generally experiences the highest temperatures during combustion; therefore, this region of the catalyst will likely experience the highest level of thermal deactivation through sintering. In this case, a low initial ratio of catalyst: substrate will reduce the change in performance on high temperature sintering. Conversely, at the upstream end of the catalyst, a higher ratio of catalyst to substrate will improve light-off behavior and will be thermally sintered to a lower extent than the downstream end of the catalyst substrate, thereby maintaining the effectiveness of the catalyst, such as precious metal, used.

Catalyst promoter materials (as described elsewhere herein) may also be used beneficially in inequivalent amounts in axial zoning of the catalyst substrate to promote either light-off activity or minimize thermal sintering.

In addition to the upstream section and the downstream catalyst section, the catalytic combustor may comprise further elements to complement these sections. For example, in some embodiments, a system further comprises one or more mixing or flame holding devices, or bluff body, positioned downstream of the catalyst sections. The purpose of such devices is to contain any gas that has passed through the catalyst sections in an environment so as to allow further combustion outside of the internal volumes of the catalysts. With some of the combustion process being completed downstream of the catalyst substrate, the maximum temperature to which the catalyst substrate is subject can be significantly reduced. Another advantage of these devices is that they allow for further reduction of HC and CO emissions and reduce the pressure drop due to the presence of the catalyst substrate.

In some embodiments, the system may further comprise one or more of the following components:
(a) a compressor arranged to receive air and to compress the air;
(b1) a fuel system operable to supply fuel into the compressor, such that a mixture of air and fuel can be/is discharged from the compressor;

(b2) a fuel system operable to supply gaseous fuel into the compressor;

(b3) a fuel system operable to supply suitably atomized liquid fuel into the compressor;

(c) a turbine arranged to receive the combustion gases, when present, from the catalytic combustor and to use the hot gases to produce mechanical power that drives the compressor;

(d) a recuperator arranged to receive exhaust gases from the turbine and the mixture or air discharged from the compressor and cause heat exchange therebetween such that the mixture or air can be/is pre-heated before entering the catalytic combustor.

Typically, the compressor and the turbine are mechanically coupled by at least one shaft, though the disclosure contemplates the use of systems comprising two or three shafts for this purpose.

In some embodiments, the compressor is a two-stage or multi-stage compressor (e.g., having three or more stages), optionally with intercooling between the compressor stages.

The system may further comprise one or more fuel/air injectors or mixing devices, optionally positioned upstream of the upstream section, and in some embodiments upstream of the catalytic combustor, positioned to provide or modulate a fuel/air mixture into the catalytic combustor. The fuel and air may be metered independently into this or these mixing device(s). For gaseous fuel such a methane or natural gas, these fuel injectors/mixers may inject the fuel and cause it to be mixed with the air using any of the designs familiar to those skilled in the art. For a liquid fuel such as gasoline, diesel fuel or alcohol fuels, the fuel injectors/mixers may inject the fuel as a spray of micronized or atomized droplets and cause the fuel to vaporize or evaporate to form a gaseous mixture at the catalyst inlet.

In still other embodiments, the system may comprise additional ports or inline devices for injecting hydrocarbon fuel into the compressor, for premixing with air, or into passages in front of or after passing through the recuperator, but before entering the catalytic combustor, depending on the gaseous or liquid fuel type. In such situations, the compressor and recuperator can be used variously as mixing/atomization and vaporization devices.

In some embodiments, the systems may further comprise a variety of sensors and control mechanisms for monitoring and controlling the operation of the systems. Thermocouples or resistance temperature measurement devices can be located at various locations in the catalytic combustor, and elsewhere throughout the system, including attached to the upstream section and the downstream catalyst section, or located just downstream of the catalyst sections to measure the gas temperature exiting the catalyst sections or combustor. These sensors may then be connected to one or more controllers that monitor and control the overall system.

Figure 2:
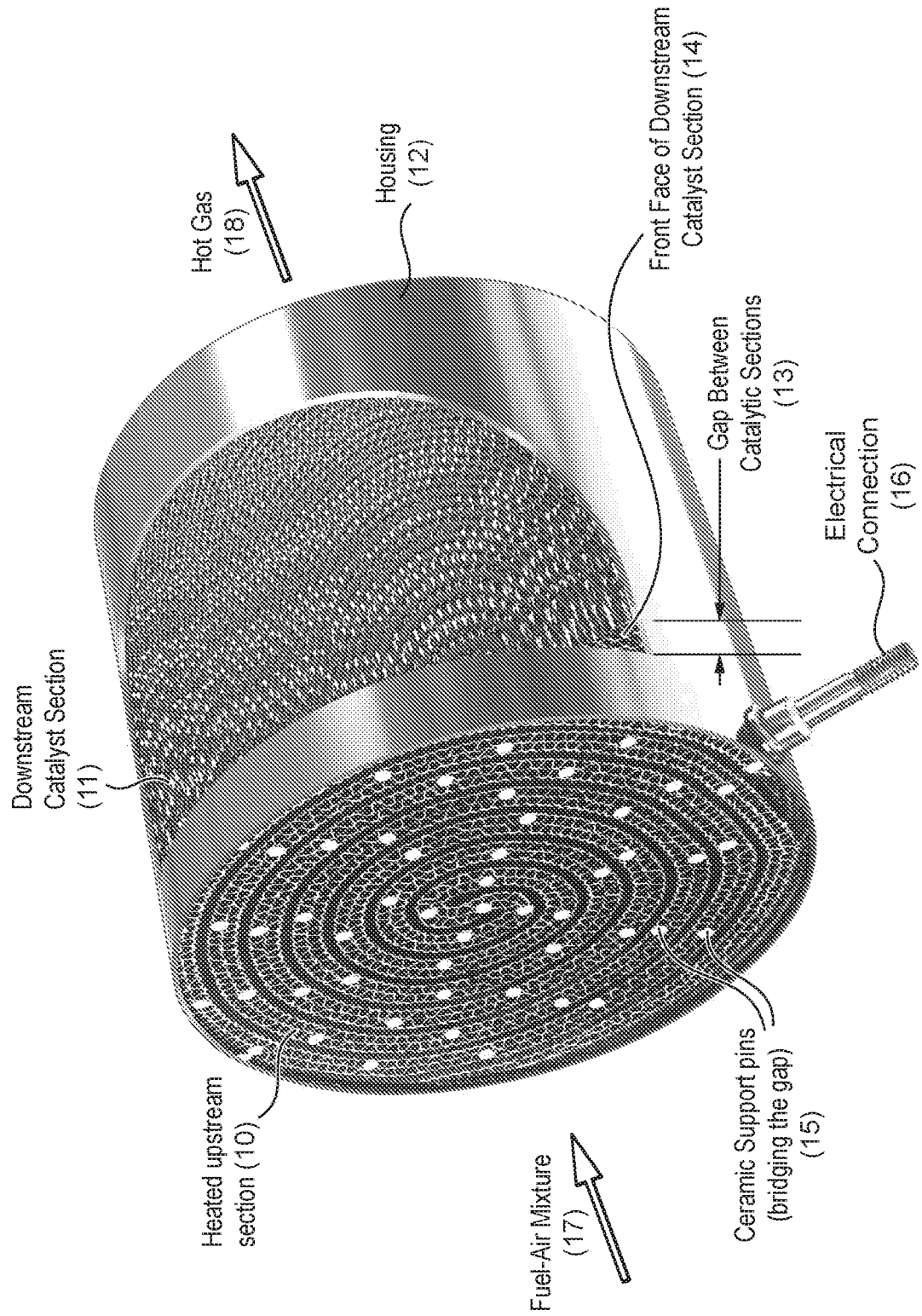
FIG. 2 provides a second schematic showing salient features of one embodiment of the catalytic combustor, according to one embodiment of the present invention.

Several of the disclosed embodiments may be better envisioned by referring to FIGS. 1 and 2. FIG. 1 shows a schematic of a recuperative gas turbine comprising compressor 1, catalytic combustion chamber 2, and turbine 3. Air 4 is supplied to compressor 1 which produces compressed air having a predetermined higher pressure and higher temperature. The compressed air is mixed with a suitable hydrocarbonaceous fuel in fuel mixing section 5 (A, B, or C). As shown in FIG. 1, the fuel mixing section 5 can be located right before the combustor (5A), upstream of recuperator (5B), or right before the compressor (5C). After mixing of the fuel and air, it is passed to combustor 2 that is electrically heated in accordance with the present disclosure. After the compressed air and fuel have reacted together in the presence of the catalyst, the resulting higher temperature combustion-products gas mixture is passed to turbine 3 where the energy of this gas is converted into rotational energy of turbine shaft 6. The rotational energy of turbine shaft 6 is used to drive compressor 1 as well as any other output device such as generator 7. Generator 7 can also start the gas turbine.

FIG. 2 shows key details of a catalytic combustor assembly, according to one embodiment of the present invention. Air-Fuel mixture (17) passes first through the heated upstream section (10) then through d18ownstream catalyst section (11), coming out as hot gas ( ). The two sections (10 and 11) can be held together by a housing (12) and there can be a gap (13) between the two sections (10 and 11). Ceramic support pins (15) are used to bridge the gap (13). Electrical connection (16) can be located outside of housing in the upstream section (10). As shown in FIG. 2, the front face of the downstream catalyst section (14) is separated from the upstream section (10). It should be noted that while the unit in FIG. 2 is of round cross section, the combustor assembly could be embodied in other cross-sectional shapes such as oval, ellipse, polygons or annular or any other prismatic shape to suit practical engineering and application restraints.

For example, in an embodiment available from Emitec called Emicat™, the single unit (assembly) can comprise a honeycomb monolith section which carries an electric current that resistively heats the foil to increase the temperature of gas that flows through the substrate core (11). The resistive slice (10) (upstream section) is fixed to the downstream substrate (11) with ceramic pins (15), which is fixed to the outer mantle (housing) (12) of the downstream unit (assembly). The main matrix (downstream catalyst section) (11) of the single unit is usually designed to have greater cell density than the resistive heating slice (10) (upstream section) in order to: maximise catalytic performance in the main matrix (downstream catalyst section), and upstream section facilitate and simplify the upstream headed matrix (core).

The structure of metallic substrates (Matrices or cores) can be enhanced through the adoption of non-laminar flow structures, such as:

1. Emitec's TS™ foil, LS™ foil, PE™ foil, LSPE™ foil.
2. PCI Inc. "Microlith"®

The selection of non-laminar flow technologies in this system might cause an increase in combustor backpressure for an equivalent volume of catalyst. Such a selection would need to enable higher performance, lower cost or lower combustion catalyst volume, or a combination thereof, in order to avoid a negative impact on system efficiency.

Applications

Further embodiments include any equipment that incorporates the systems described herein. For example, any stationary industrial, commercial, marine, automotive, or airborne power generator comprising any of the embodied systems described herein are considered within the scope of the present disclosure including as a "prime mover" or auxiliary power source for ancillary use or as a range extender.

Similarly, any mobile terrestrial, marine, or airborne vehicle comprising as a means of propulsion any of the system embodiments disclosed herein are considered within the scope of the present disclosure. In particular, automobiles, trucks, or off-road vehicles are considered specific embodiments of interest. Such systems are particularly attractive when an extension of range of endurance is required, for example where the system is used to extend the range of an EV or as the combustion engine of a plug-in hybrid vehicle.

Methods of Using the Systems

In addition to the systems and uses described elsewhere herein, the present disclosure includes those embodiments for using these systems. Systems of embodiments of the present invention may be viewed as comprising two main modes of operation—start-up and running operation.

Certain embodiments provide methods of operating a recuperated gas turbine engine system, each method comprising one or more of the following steps:

(a) providing energy to the electrical heater to heat the upstream section to a temperature at least equal to a light-off temperature of fuel and air, (b) introducing a mass flow of the mixture of air and fuel to the heated upstream section, so as to initiate catalytic combustion in the heated upstream section, and (c) increasing the mass flow of the mixture of air and fuel through the heated upstream section, so as to project the combusting mixture of fuel and air into the second catalyst section, the combusting mixture having an associated heat. In the context of other discussions herein, this aspect of the methods may be described in terms of start-up conditions. As used herein, the term "ignition" may be synonymous with the term "light off" temperature. It is envisioned that these start-up conditions are automatically controlled based on sensed operating parameters.

The catalytic reaction temperature of the fuel/air mixture is clearly defined by a number of factors, including the air/fuel blend ratio, the fuel type (e.g., including hydrogen and hydrocarbon), and the nature of the catalyst, but in each case, the temperature can be predetermined for a given condition. Additionally, the length of time that energy is provided to the electric resistance heater may be defined by a pre-determined time after the introduction of the fuel/oxygen-containing mixture, or in response to sensor feedback based on the operation of the catalyst sections (e.g., when the heat of the catalytic reaction is sufficient to maintain the downstream catalyst section at its steady state running condition). Once these conditions are achieved, or a separate decision is made by an operator to manually do so, or at any other time, the methods may further comprise de-energizing the electrical heater, while maintaining the catalytic combustion.

In further embodiments, the methods may further comprise maintaining the increased mass flow of the mixture of air and fuel through the heated upstream section, such that the heat associated with the combusting mixture of fuel and air, on contacting the downstream catalyst section is sufficient to raise the temperature of at least a portion of the downstream catalyst section to a catalytic ignition temperature of the mixture of a fuel and air in the downstream catalyst section. In other embodiments, the method further comprises maintaining the increased mass flow for a time sufficient to provide that substantially all of the downstream catalyst section is heated to the catalytic ignition temperature of the mixture of a fuel and air, so that the mixture of fuel and air, as it passes therethrough, is combusted substantially throughout the downstream catalyst section. In preferred embodiments, the method includes adjusting the mass flow such that substantially all of the combustion takes place in the downstream catalyst section. In the context of other discussions herein, these aspects of the methods may be described in terms of running conditions.

In some embodiments, the normal steady-state, operating temperature of the catalyst(s) may be in the range of about 300° C. to about 1000° C. These operating temperatures depend in large part on the nature and configuration of the catalyst and catalyst sections. In some embodiments, the electrical power is first applied to the electric resistance heater to preheat the upstream section to within about 100° C., or preferably within about 50° C. of the desired steady-state operating temperature, or to a higher temperature. Again, the electrical heater (e.g., electrical resistance heater) may be de-energized when any of the following conditions occur: (i) the heat of reaction released by the reaction of the fuel and air in the upstream catalytic section is sufficient to raise the temperature of at least a portion of the downstream catalyst section to an ignition temperature of the mixture of a fuel and air in the downstream catalyst section; and/or (ii) the fuel/air-containing mixture at the combustor outlet reaches a predetermined temperature limit; and/or (iii) a predetermined period of time has elapsed; and/or (iv) the fuel/air mixture entering the upstream section is above the catalyst light-off temperature.

In another embodiment, the electrical power is first applied to the electrical heater (e.g., electrical resistant heater) to preheat an upstream non-catalytic section to within about 100° C., or preferably within about 50° C. of the desired steady-state operating temperature, or to a higher temperature. Again, the electrical heater (e.g., electrical resistant heater) may be de-energized when any of the following conditions occur: (i) the heat of reaction released by the reaction of the fuel and air in the downstream catalyst section is sufficient to spread the reaction through an increasing portion of the downstream catalyst section. (ii) the fuel/air-containing mixture at the combustor outlet reaches a predetermined temperature limit; and/or (iii) a predetermined period of time has elapsed; and/or (iv) the fuel/air mixture entering the upstream section is above the catalyst light-off temperature.

Likewise, the methods may further comprise modulating the mass flow or the ratio of air and fuel in the mixture of air and fuel to accommodate load requirements of the recuperated gas turbine engine system. These may be adjusted manually, but in some embodiments it is more efficient to do so by a control system within the turbine system.

The operation of the recuperated gas turbine system generally, and the upstream section and the downstream catalyst section specifically, may depend as well on the nature of the fuels employed, for example, the nature of the composition of the mixture of fuel and air being introduced to the sections. The ratio between the amount of air and fuel being supplied to the catalytic combustion chamber is specified as the $\lambda$-value. The $\lambda$-value is a measure of the relative air/fuel ratio and constitutes the ratio between the real air/fuel ratio and the stoichiometric air/fuel ratio. Low $\lambda$-values mean a "rich" fuel mixture with a large proportion of fuel in relation to the amount of air, while a high 2-value means a "lean" air/fuel mixture with a relatively higher amount of air in the mixture. In operating the disclosed systems, typically the air/fuel mixture has a $\lambda$-value of greater than 1, preferably in a range of from 1.5 to 8, more preferably from 4 to 8, where the $\lambda$-value is a ratio of the real air/fuel ratio and the stoichiometric air/fuel ratio. This $\lambda$-value can be modulated during the course of combustion depending on needs of the system.

When used as part of a recuperated gas turbine, the catalyst can sustain combustion despite a low inlet temperature. This is achieved by using a low velocity, typically 5-10 times lower than the velocity that occurs at engine running conditions. In this start-up mode, $\lambda$ is maintained typically between 1.5 and 7 whereas the recuperated gas turbine will run with $\lambda$ between 4 and 8 depending on the degree of recuperation. By maintaining flow and λ within these limits, electrical power is only required for a short period of time. This allows warm-up of the recuperator and raising combustor inlet temperature above ignition temperature, after which the flow can be rapidly increased to gas turbine operating conditions.

Some embodiments of the present disclosure include the methods of operating a recuperative gas turbine engine, as described herein, the methods comprising one or more steps of:

(a) flowing at least air through the compressor;

(b) providing energy to the electrical heater to heat the upstream section to a temperature at least equal to an ignition temperature of a mixture of a fuel and the air;

(c) introducing a mass flow of the mixture of the fuel and air to the heated upstream section, such that the mixture of fuel and air is combusted in the upstream section;

(d) increasing the mass flow of the mixture of the fuel and air such that the flow of combusting mixture heats the downstream catalyst section to a temperature above an ignition temperature of the downstream catalyst section;

(e) maintaining the mass flow of the mixture of fuel and air through the upstream and downstream catalyst section so that the mixture of fuel and air, as it passes through the downstream catalyst section, is combusted therein to form heated combustion gases that exit the downstream catalyst section;

(f) directing at least a portion of the heated combustion gases exiting the downstream catalyst section and the catalytic combustor through the turbine to produce mechanical power, and using the mechanical power in part to drive the compressor;

(g) directing some or all of the heated combustion gases passing through the turbine to the recuperator; and (h) using the heated combustion gases in the recuperator to preheat the air or the mixture of the fuel and air being introduced to the heated upstream section at a temperature typically above the light-off temperature of the catalyst.

Figure 3:
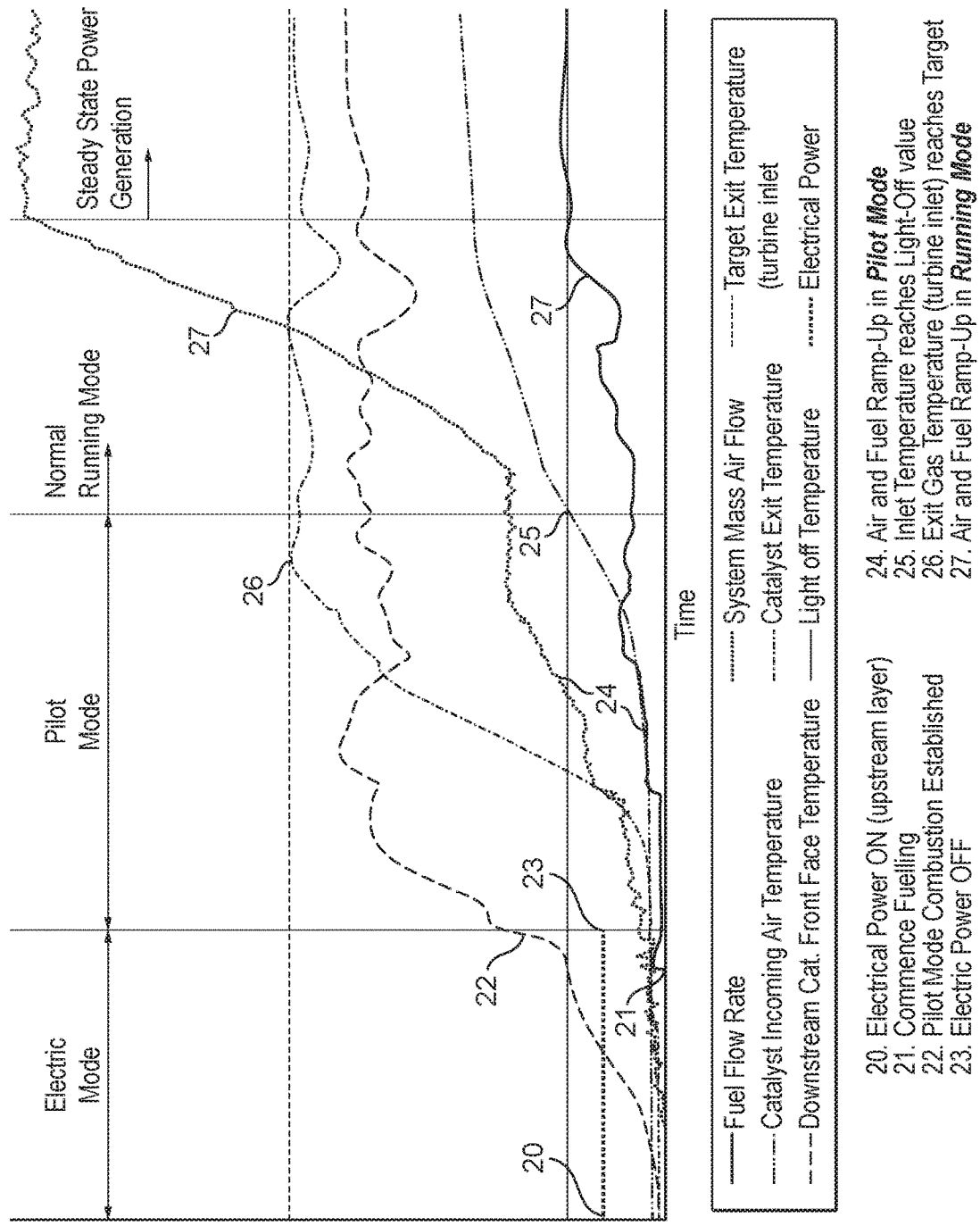
FIG. 3 provides a typical start-up sequence of the combustor.

A typical start-up sequence of the combustor is shown in FIG. 3, which is taken from a test where the combustor is used as part of a recuperated gas turbine. Several parameters are shown against time including air and fuel flow as well as electrical power and several temperatures. Three phases occur during the start-up sequence: Electrical Mode, Pilot Mode and Normal Running mode. Initially at (20) power is applied to the up-stream heater layer or heated catalytic layer and a small air flow quantity applied. Once the upstream end of the downstream catalyst reaches the catalytic light-off temperature, initial fueling is applied (21). The power is turned off (23) once the catalytic combustion is established and increasing in the downstream catalyst (22). Air and fuel are then ramped up in a controlled manner (24) in pilot mode in an optimized sequence until target combustor exit (turbine inlet) temperature is reached (26). The ramp-up is controlled as to minimizing gaseous emissions while the main thermal mass of the gas turbine, the recuperate, increases in temperature. At (25) the recuperator reaches a temperature where it can supply air to the combustor above the catalytic light-of temperature. From this point, fuel and air can be ramped up more rapidly (27) in an optimum ratio yielding the desired turbine inlet temperature (26). This is continued until steady state power generation is achieved. It can be seen from the traces that sustained combustion can be achieve in "Pilot Mode" after the electric power is switched off but while the inlet temperature is below the light-off temperature of the catalytic combustion element.

Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially" of. For those embodiments provided in terms of "consisting essentially of," the basic and novel characteristic(s) is the ability of the systems to combust fuels efficiently, without the need for separate igniters or heating the fuel mixtures above ignition temperatures prior to introducing them to the catalysts. Materials or steps which do not detract from such operability would be considered within the scope of such embodiments.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

"Optional" or "optionally" means that the subsequently described circumstance may or may not occur, so that the description includes instances where the circumstance occurs and instances where it does not. Similarly, embodiments which refer to a component or step as being "optionally present," those embodiments include separate independent embodiments in which the step or component is present or absent. The description "optional" allows for, but does not require, the optional condition to occur.

The following listing of embodiments is intended to complement, rather than replace or supersede, the previous descriptions.

Embodiment 1 A system comprising a recuperated gas turbine engine with a catalytic combustor, the catalytic combustor comprising:
  (a) an upstream section comprising an electrical heater and
  (b) a downstream catalyst section, wherein the upstream section and the downstream catalyst section are disposed adjacent to and in fluid communication with one another.

In certain aspects of this Embodiment, the upstream section and the downstream catalyst section comprise a spacer between them; in other aspects, the two sections are in physical contact with one another; in still other aspects, the two sections contain a defined air gap between them. The air gap may be important to avoid short circuits in metallic substrate. For a metallic-ceramic combination substrate, it may be possible to avoid a discrete 'layer gap' across the diameter of the catalyst. In other aspects, there can also be ceramic insulating links between the two sections constituting physical support with electrical insulation.

Embodiment 2 The system of Embodiment 1, wherein the upstream section comprising the electrical heater is the only ignition source in the catalytic combustor. In independent aspects of this Embodiment, some Embodiments have and do not have separate ignition sources, but it is preferred for there to be no ignition source beyond the electrical heater. In other aspects, the system contains no additional igniters anywhere in the system.

Embodiment 3 The system of Embodiment 1 or 2, wherein the upstream section and the downstream catalyst section are integrated in a single unit. In certain independent aspects of this Embodiment, the two sections are compositionally the same or different from one another, either by virtue of the substrate materials or the catalyst materials contained within each section.

Embodiment 4 The system of any one of Embodiments 1 to 3, wherein the single unit/substrates/matrices/cores are "monolithic laminar flow substrates or are substrates with some degree of turbulence enhancement. (Example, PCI Inc. "microlithic").

Embodiment 5 The system of any one of Embodiments 1 to 4, wherein the upstream section and the downstream catalyst section each contain pores or channels which allow for the passage of an ignitable mixture (e.g., gas or a vapor) through both of the upstream section and the downstream catalyst section.

Embodiment 6 The system of Embodiment 5, wherein pores or channels in the upstream section are optimized for low-flow start-up conditions and the downstream catalyst section is optimized for run conditions. In certain aspects of this Embodiment, the pores or channels in the upstream section are larger than those of the downstream catalyst section, or are otherwise modified to provide for less resistant flow in the upstream section than in the downstream catalyst section (e.g., by directness of the flow path).

Embodiment 7 The system of Embodiment 5 or 6, wherein the pores or channels in the upstream section and the downstream catalyst section have associated volumes and the ratio of the pore or channel surface area of the upstream section to those of the downstream catalyst section are in a range of from about 0.5% to 50%.

Embodiment 8 The system of any one of the Embodiments 1 to 7 wherein the upstream section does not comprise an upstream catalyst, thus, the upstream section does not have any catalytic functionalities.

Embodiment 9 The system of any one of Embodiments 1 to 7, wherein the upstream section further comprises an upstream catalyst.

Embodiment 10 The system of any one of Embodiments 1 to 9, wherein the downstream catalyst section further comprises a downstream catalyst.

Embodiment 11 The system of any one of Embodiments 1 to 10, wherein the upstream catalyst is different than the downstream catalyst. In certain aspects of this Embodiment, the catalyst substrate between the upstream section and the downstream catalyst section may also be different.

Embodiment 12 The system of any one of Embodiments 1 to 10, wherein the upstream catalyst is the same as the downstream catalyst. In certain aspects of this Embodiment, the catalyst substrate between the upstream section and the downstream catalyst section may also be the same.

Embodiment 13 The system of any one of Embodiments 1 to 12, wherein either or both of the upstream catalyst and the downstream catalyst independently comprise Ag, Au, Cu, Co, Cr, Fe, Ir, Mo, Mn, Ni, Pd, Pt, Rh, Sc, Ti, V, W, Y, Zn, Zr, or a combination thereof, in either metallic or oxide form. In independent aspects of this Embodiment, the catalysts independently comprise Group VIII noble metals. In independent aspects of this Embodiment, the catalysts independently comprise platinum group metals. In other aspects, the catalysts independently comprise Ag, Au, Co, Cu, Ir, Ni, Pd, Pt, Rh, Zn, or combinations thereof. In still other aspects, the catalysts comprise oxides of Cr, Fe, Ir, Mo, Mn, Ti, V, W, Y, Zr, or combinations thereof. In still other aspects, that catalysts comprise Ce, and/or Sn.

Embodiment 14 The system of any one of Embodiments 1 to 13, wherein the catalytic combustor further comprises one or more mixing or flame holding devices positioned downstream of the downstream catalyst section.

Embodiment 15 The system of any one of Embodiments 1 to 14, further comprising a fuel/air mixing device positioned upstream of the catalytic combustor. In certain aspects of this Embodiment, the mixing device is positioned to provide or modulate a fuel/air mixture into the catalytic combustor.

Embodiment 16 The system of any one of Embodiments 1 to 15, further comprising one or more of:
  (a) a compressor arranged to receive air and to compress the air;
  (b1) a fuel system operable to supply fuel into the compressor, such that a mixture of air and fuel can be/is discharged from the compressor;
  (b2) a fuel system operable to supply gaseous fuel into the compressor;

(b3) a fuel system operable to supply suitably atomized liquid fuel into the compressor;

(c) a turbine arranged to receive the combustion gases, when present, from the catalytic combustor and to expand the gases to produce mechanical power that in part drives the compressor; and (d) a recuperator arranged to receive exhaust gases from the turbine and the air or mixture discharged from the compressor and cause heat exchange therebetween such that the mixture can be/is pre-heated before entering the catalytic combustor.

In certain aspects of this Embodiment, (b1), (b2), and (b3) can be alternatives for the fuel system, if required by the system.

Embodiment 17 The system of Embodiment 16, wherein the compressor and the turbine are mechanically coupled by at least one shaft. In some independent aspects of this Embodiment, the compressor may be a one-stage, two-stage, or multistage compressor. In independent aspects, a two-stage compressor is coupled on a two-shaft machine. In some aspects, a low pressure compressor is connected to a low pressure turbine and/or a high pressure compressor is connected to a high pressure machine. In some aspects, a third shaft can be introduced to allow a power turbine to be connected to a generator or other load. Exhaust from this third turbine may feed to the recuperator.

Embodiment 18 The system of Embodiment 16 or 17, wherein the compressor is a multi-stage compressor. In certain aspects, the compressor is a two-stage compressor. In some aspects, the two-stage or multistage compressor is equipped with intercooling between the compressor stages.

Embodiment 19 An industrial, commercial, marine, or airborne powder generator comprising the system of any one of Embodiments 1 to 18.

Embodiment 20 A mobile terrestrial, marine, or airborne vehicle comprising as a means of propulsion the system of any one of Embodiments 1 to 18. In certain aspects of this Embodiment, the mobile vehicle is an automobile.

Embodiment 21 A method of operating the recuperated gas turbine engine system of any one of Embodiments 1 to 18, the method comprising one or more of:

(a) providing energy to the electrical heater to heat the upstream section to a temperature at least equal to an ignition temperature of a mixture of a fuel and air, (b) introducing a mass flow of the mixture of air and fuel to the heated upstream section, so as to initiate catalytic combustion upstream section, and (c) maintaining or increasing the mass flow of the mixture of air and fuel through the upstream section, so as to project the mixture of fuel and air into the downstream catalyst section, thereby increasing the catalytic reaction.

In certain aspects of this Embodiment, the mass flow of the mixture at start-up is in a range of from 5-10 times lower than the mass flow rate that occurs at engine running conditions.

Embodiment 22 The method of Embodiment 21, where the catalytic reaction is initiated in the upstream section before spreading downstream to the main (downstream) catalytic matrix.

Embodiment 23 The method of Embodiment 22, further comprising maintaining the increased mass flow for a time sufficient to provide that substantially all of the downstream catalyst section is heated to the catalytic temperature or higher of the mixture of a fuel and air, so that the mixture of fuel and air, as it passes therethrough, is combusted throughout the downstream catalyst section. Preferably, owing to the relative proportions of the upstream section and the downstream catalyst section and the mass flow rate of the mixture, most if not substantially all of the combustion takes place in downstream catalyst section.

Embodiment 24 The method of any one of Embodiments 21 to 23, further comprising modulating the mass flow of the mixture of air and fuel to accommodate load requirements of the recuperated gas turbine engine system.

Embodiment 25 The method of any one of Embodiments 21 to 24, further comprising de-energizing the electrical heater, while maintaining the combustion in at least the downstream catalyst section.

Embodiment 26 The method of any one of Embodiments 21 to 25, further comprising maintaining the combustion in in a stable manner before the inlet mixture has reached the catalytic light-off temperature (Pilot Mode).

Embodiment 27 The method of any one of Embodiments 21 to 26, wherein the mixture of fuel and air has a $\lambda$-value of greater than 1, preferably in a range of from 2 to 5 during startup and/or in a range of from 4 to 8 during steady state operation, where the $\lambda$-value is a ratio of the real air/fuel ratio and the stoichiometric air/fuel ratio.

Embodiment 28 The method of Embodiment 27, further comprising modulating the $\lambda$-value of the mixture of fuel and air during the course of combustion. In independent aspects, the method comprises modulating the $\lambda$-value to richer fuel mixtures; in independent aspects, the method comprises modulating the $\lambda$-value to leaner fuel mixtures. In some aspects, the method comprises alternatively increasing and reducing the richness of the mass flow, optionally in response to a control mechanism monitoring the system.

Embodiment 29 A method of operating a recuperative gas turbine engine or any one of Embodiments 16 to 18, the method comprising at least one of the steps of:

(a) compressing at least air in the compressor;

(b) providing energy to the electrical heater to heat the upstream section to a temperature at least equal to a light-off temperature of a mixture of a fuel and the air;

(c) introducing a mass flow of the mixture of the fuel and air to the heated upstream section, such that the mixture of fuel and air is combusted in the upstream section;

(d) increasing the mass flow of the mixture of the fuel and air such that the flow of combusting mixture heats the downstream catalyst section to above an ignition temperature of the downstream catalyst section;

(e) maintaining the mass flow of the mixture of fuel and air through the upstream section and the downstream catalyst section so that the mixture of fuel and air, as it passes through the downstream catalyst section, is combusted therein to form heated combustion gases that exit the downstream catalyst section;

(f) directing at least a portion of the heated combustion gases exiting the downstream catalyst section and the catalytic combustor through the turbine to produce mechanical power, and using the mechanical power in part, to drive the compressor;

(g) directing some or all of the heated combustion gases passing through the turbine to the recuperator; and (h) using the heated combustion gases in the recuperator to preheat the mixture of the fuel and air being introduced to the heated upstream section to above the light off temperature of the catalyst.

Embodiment 30 The method of Embodiment 29, further comprising modulating the mass flow of the mixture of the fuel and air introduced to the upstream section. In independent aspects, the method comprises increasing the mass flow; in independent aspects, the method comprises reducing the mass flow; in some aspects, the method comprises alternatively increasing and reducing the mass flow, optionally in response to a control mechanism monitoring the system.

Embodiment 31 The method of Embodiment 29 or 30, wherein the mixture of fuel and air has a 2-value of greater than 1, the method further comprises modulating the λ-value of the mixture of fuel and air during the course of combustion.

Embodiment 32 The method of any one of Embodiments 21 to 31, the method further comprising de-energizing the electrical heater.

Embodiment 33 The system of any one of Embodiments 1-18, wherein the single unit can be of round cross section or other cross-sectional shapes, such as oval, ellipse, polygons or annular or any other prismatic shape to suit practical engineering and application restraints.

As those skilled in the art will appreciate, numerous modifications and variations of the present invention are possible in light of these teachings, and all such are contemplated hereby.

The disclosures of each patent, patent application, and publication cited or described in this document are hereby incorporated herein by reference, each in its entirety, for all purposes.

What is claimed:

1. A system comprising a recuperated gas turbine engine with a catalytic combustor, the catalytic combustor comprising:
    (a) an upstream section comprising an electrical heater and
    (b) a downstream catalyst section, wherein the upstream section and the downstream catalyst section are disposed adjacent to and in fluid communication with one another;
    wherein the upstream section and the downstream catalyst section are integrated in a single unit;
    wherein the upstream section and the downstream catalyst section each contain pores or channels; and
    wherein the ratio of the pore or channel surface area of the upstream section to those of the downstream catalyst section are in a range of from about 0.5% to 50%.

2. The system of claim 1, wherein the upstream section further comprises an upstream catalyst.

3. The system of claim 1, wherein the downstream catalyst section further comprises a downstream catalyst.

4. The system of claim 1, wherein the upstream section comprising the electrical heater is the only initiation source in the catalytic combustor and no other source or ignition system is required.

5. The system of claim 1, wherein one or both of the upstream or downstream catalysts independently comprise a catalyst comprising Ag, Au, Cu, Co, Cr, Fe, Ir, Mo, Mn, Ni, Pd, Pt, Rh, Sc, Ti, V, W, Y, Zn, Zr, or a combination thereof, in either metallic or oxide form.

6. The system of claim 1, comprising a fuel/air mixing and/or a vaporizing device positioned upstream of the catalytic combustor, positioned to provide or modulate a fuel/air mixture into the catalytic combustor.

7. The system of claim 1, further comprising:
    (a) a compressor arranged to receive air and to compress the air;
    (b) a fuel system operable to supply fuel into the compressor, such that a mixture of compressed air and fuel can be/is discharged from the compressor;
    (c) a turbine arranged to receive the combustion gases, when present, from the catalytic combustor and to expand the gases to produce mechanical power that in part, drives the compressor;
    (d) a heat exchanger or "recuperator" arranged to receive exhaust gases from the turbine and the air or mixture discharged from the compressor and cause heat exchange there between such that the air or mixture can be/is pre-heated before entering the catalytic combustor.

8. A mobile terrestrial, industrial, commercial, marine, or airborne power generator comprising the system of claim 1.

9. A method of operating a system comprising a recuperated gas turbine engine with a catalytic combustor, the catalytic combustor comprising: (a) an upstream section comprising an electrical heater and (b) a downstream catalyst section, wherein the upstream section and the downstream catalyst section are disposed adjacent to and in fluid communication with one another; wherein the upstream section and the downstream catalyst section are integrated in a single unit; wherein the upstream section and the downstream catalyst section each contain pores or channels; and wherein the ratio of the pore or channel surface area of the upstream section to those of the downstream catalyst section are in a range of from about 0.5% to 50%, the method comprising:
    (a) providing energy to the electrical heater to heat the upstream section to a temperature at least equal to the catalytic reaction temperature of a mixture of a fuel and air mixture,
    (b) introducing a mass flow of the mixture of air and fuel to the heated upstream section, so as to initiate catalytic combustion, and
    (c) maintaining or increasing the mass flow of the mixture of air and fuel through the catalyst, so as to provide a combusting mixture of fuel and air into the second section, the combusting mixture having an associated heat.

10. The method of claim 9, further comprising a step of modulating the mass flow and mixture of air and fuel to accommodate load requirements of the recuperated gas turbine engine system.

11. The method of claim 9, further comprising a step of de-energizing the electrical heater, while maintaining stable catalytic combustion.

12. The method of claim 9, further comprising a step of maintaining stable combustion before the inlet mixture has reached the catalytic light-off temperature.

13. The method of claim 9, the method further comprising de-energizing the electrical heater.

14. The method of claim 9, further comprising a step of maintaining or increasing the mass flow of the mixture of air and fuel through the heated catalyst, such that the heat associated with the combusting mixture of fuel and air, on contacting the downstream catalyst section, is sufficient to raise the temperature of at least a portion of the downstream catalyst section to an ignition temperature of the mixture of a fuel and air in the downstream catalyst section.

15. The method of claim 14, further comprising a step of maintaining the increased mass flow for a time sufficient to provide that substantially all of the downstream catalyst section is heated to at least the catalytic combustion temperature of the mixture of a fuel and air, so that stable catalytic combustion is maintained and can be increased.

16. The method of claim 15, further comprising a step of maintaining or increasing the mass flow until the recuperator is heated to the extent that air or air-fuel mixture is provided to the combustor at above the combustor core light-off temperature.

17. A method of operating a recuperative gas turbine engine of in a system with a catalytic combustor, the catalytic combustor comprising: (a) an upstream section comprising an electrical heater and (b) a downstream catalyst section, wherein the upstream section and the downstream catalyst section are disposed adjacent to and in fluid communication with one another; wherein the upstream section and the downstream catalyst section are integrated in a single unit; wherein the upstream section and the downstream catalyst section each contain pores or channels; and wherein the ratio of the pore or channel surface area of the upstream section to those of the downstream catalyst section are in a range of from about 0.5% to 50%; wherein the system further comprising
- (a) a compressor arranged to receive air and to compress the air;
- (b) a fuel system operable to supply fuel into the compressor, such that a mixture of compressed air and fuel can be/is discharged from the compressor;
- (c) a turbine arranged to receive the combustion gases, when present, from the catalytic combustor and to expand the gases to produce mechanical power that in part, drives the compressor;
- (d) a heat exchanger or "recuperator" arranged to receive exhaust gases from the turbine and the air or mixture discharged from the compressor and cause heat exchange there between such that the air or mixture can be/is pre-heated before entering the catalytic combustor, the method comprising:
- (a) compressing at least air in the compressor;
- (b) providing energy to the electrical heater to heat the upstream section to a temperature at least equal to an ignition temperature of a mixture of a fuel and the air;
- (c) introducing a mass flow of the mixture of the fuel and air to the heated upstream section, such that the mixture of fuel and air is combusted in the upstream section;
- (d) increasing the mass flow of the mixture of the fuel and air such that the flow of combusting mixture heats the downstream catalytic section to above an ignition temperature of the downstream catalyst section;
- (e) maintaining the mass flow of the mixture of fuel and air through the upstream section and the downstream catalyst section so that the mixture of fuel and air, as it passes through the downstream catalyst section, is combusted therein to form heated combustion gases that exit the downstream catalyst section;
- (f) directing at least a portion of the heated combustion gases exiting the downstream catalyst section and the catalytic combustor through the turbine to produce mechanical power, and using the mechanical power in part to drive the compressor;
- (g) directing some or all of the heated combustion gases passing through the turbine to the recuperator; and
- (h) using the heated combustion gases in the recuperator to preheat the mixture of the fuel and air being introduced to the heated upstream section.

18. The method of claim 17, further comprising modulating the mass flow of the mixture of the fuel and air introduced to the upstream section.

19. The method of claim 17, wherein the mixture of fuel and air has a k-value of greater than 1, the method further comprises modulating the k-value of the mixture of fuel and air during the course of combustion.

* * * * *